United States Patent
Lo

(10) Patent No.: US 7,464,887 B2
(45) Date of Patent: Dec. 16, 2008

(54) PIVOTABLE WATERING NOZZLE ASSEMBLY

(76) Inventor: Shun-Nan Lo, P.O. Box 215, Taichung (TW)

( * ) Notice: Subject to any disclaimer, the term of this patent is extended or adjusted under 35 U.S.C. 154(b) by 388 days.

(21) Appl. No.: 11/341,392

(22) Filed: Jan. 30, 2006

(65) Prior Publication Data
US 2007/0138317 A1    Jun. 21, 2007

(30) Foreign Application Priority Data
Jan. 5, 2006    (TW) ............................... 94222101 U

(51) Int. Cl.
*B05B 15/08*    (2006.01)
(52) U.S. Cl. ............... 239/587.5; 239/587.1; 239/587.6
(58) Field of Classification Search ... 239/587.1–587.6, 239/588, 596, 525, 526; 222/207, 153.13, 222/536
See application file for complete search history.

(56) References Cited

U.S. PATENT DOCUMENTS

| | | | | |
|---|---|---|---|---|
| 3,915,382 A | * | 10/1975 | Davis | 239/195 |
| 4,025,000 A | * | 5/1977 | Blasnik | 239/459 |
| 4,518,122 A | * | 5/1985 | Ballu | 239/530 |
| 5,875,936 A | * | 3/1999 | Turbett et al. | 222/207 |
| 6,945,471 B2 | * | 9/2005 | McKenzie et al. | 239/237 |

* cited by examiner

*Primary Examiner*—Davis D Hwu

(57) ABSTRACT

A pivotable watering nozzle assembly includes a handle having an inlet tube received therein and a pivotable device is connected to the handle such that a nozzle member is pivotably connected to the pivotable device. A switch device for controlling the entrance of water into the nozzle member is connected to an outside of the handle. A tank member, a porous plate with orifices and a frame are respectively connected to the nozzle member. A seal ring is connected between the tank member and the nozzle member, and a seal member is connected between the porous plate and the tank member.

14 Claims, 9 Drawing Sheets

PIVOTABLE WATERING NOZZLE ASSEMBLY

FIELD OF THE INVENTION

The present invention relates to a pivotable watering nozzle assembly with a control switch device on an outside of the handle and a dispenser plate located in the nozzle member to dispense the water stream.

BACKGROUND OF THE INVENTION

A conventional watering nozzle assembly generally includes a handle with an inlet tube for being connected with a hose, and a barrel which is connected to the handle and includes an outlet from which water goes out. A nozzle member is rotatably connected to the barrel with a spring and a positioning bead connected between the nozzle member and the barrel so that the user can rotate the nozzle member to change the pattern that water goes out from the nozzle member. A general shortcoming for this type of water nozzle is that leakage usually happens at the position where the nozzle member is connected to the nozzle. This is because the seal at that position is worn out within a short period of time during frequent rotation of the nozzle member. The distance between the connection fitting on the handle to the nozzle member is so long that it is difficult to control the setting of the patterns of watering. Furthermore, the nozzle generally includes a circular end surface which cannot generate a wide watering area.

The present invention intends to provide a pivotable watering nozzle assembly which can be easily operated by one hand and includes a wide nozzle member such that the water can be spread in a wider range. The distance between the handle and the nozzle member is short and the nozzle member can be pivoted relative to the handle.

SUMMARY OF THE INVENTION

The present invention relates to a pivotable watering nozzle assembly which comprises a handle with an inlet tube received therein and a pivotable device is connected to a top end of the handle. A switch device is connected to an outside of the handle. The pivotable device includes a first connection member which has a pivot extending therefrom so as to extend through an intermediate member and is connected to a second connection member connected with a nozzle member. Two seals are mounted to the intermediate member so as to prevent leakage at the connection areas of the first and second connection members. A recess is defined in a side of the first connection member and a spring and a positioning member are received in the recess. The nozzle member has a plurality of positioning notches defined in an inside of the second connection member so that the positioning member is engaged with one of the positioning notches. A tank member, an porous plate with orifices and a frame are respectively connected to the nozzle member. A seal ring is connected between the tank member and the nozzle member. A seal member is connected between the porous plate and the tank member.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1-1 is an exploded view to show the pivotable device of the watering nozzle assembly of the present invention;

FIG. 1-2 is an exploded view to show the nozzle of the watering nozzle assembly of the present invention;

FIG. 1-3 shows an inside of the second connection member of the watering nozzle assembly of the present invention;

FIG. 1-4 shows the intermediate member of the watering nozzle assembly of the present invention;

FIG. 2 is a perspective view to show the watering nozzle assembly of the present invention;

FIG. 3 is a cross sectional view of the watering nozzle assembly of the present invention;

FIG. 4 is an enlarged view of the cross sectional view in FIG. 3;

DETAILED DESCRIPTION OF THE PREFERRED EMBODIMENT

Figure 1:
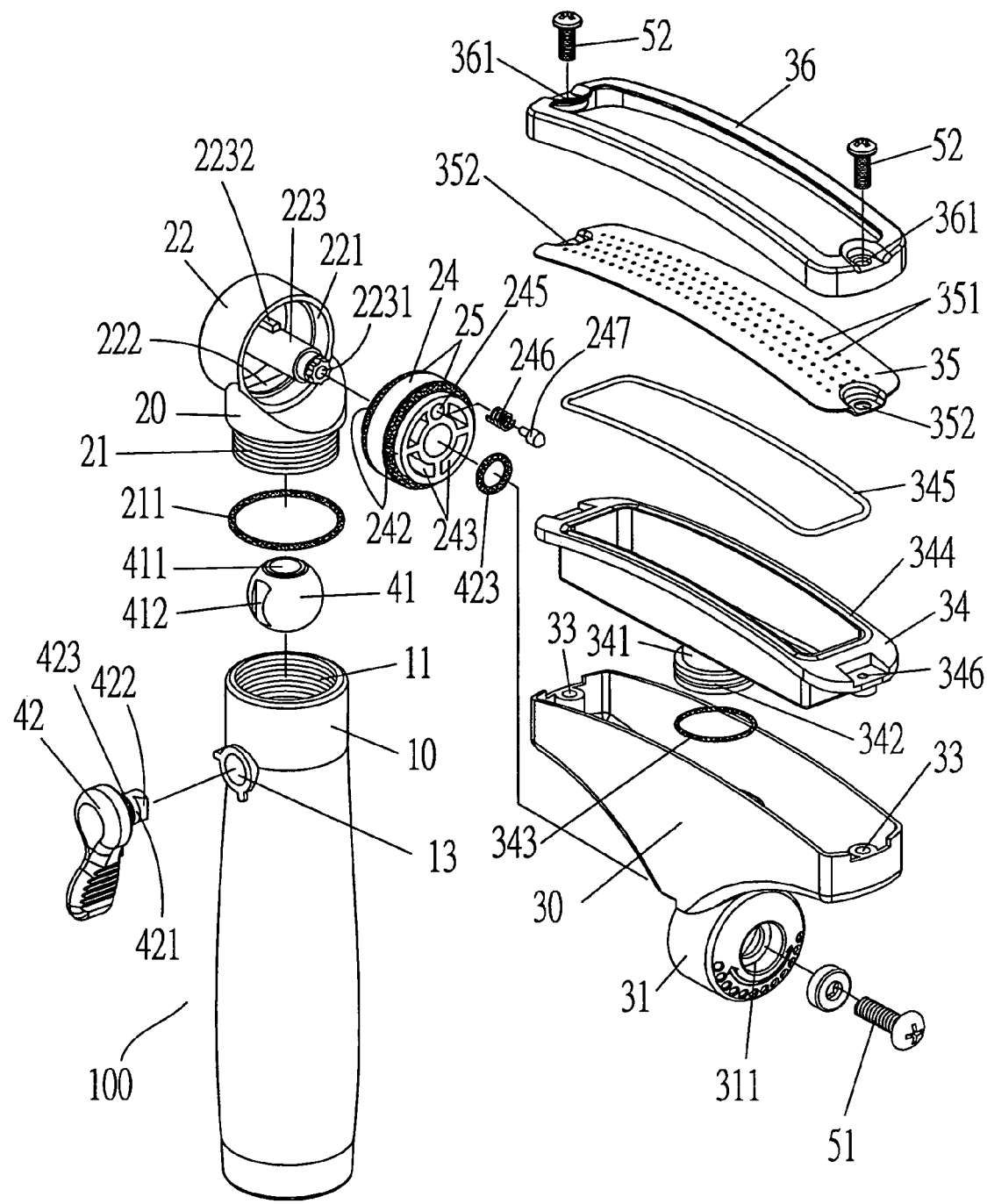
FIG. 1 is an exploded view to show the pivotable watering nozzle assembly of the present invention.
Figure 1:
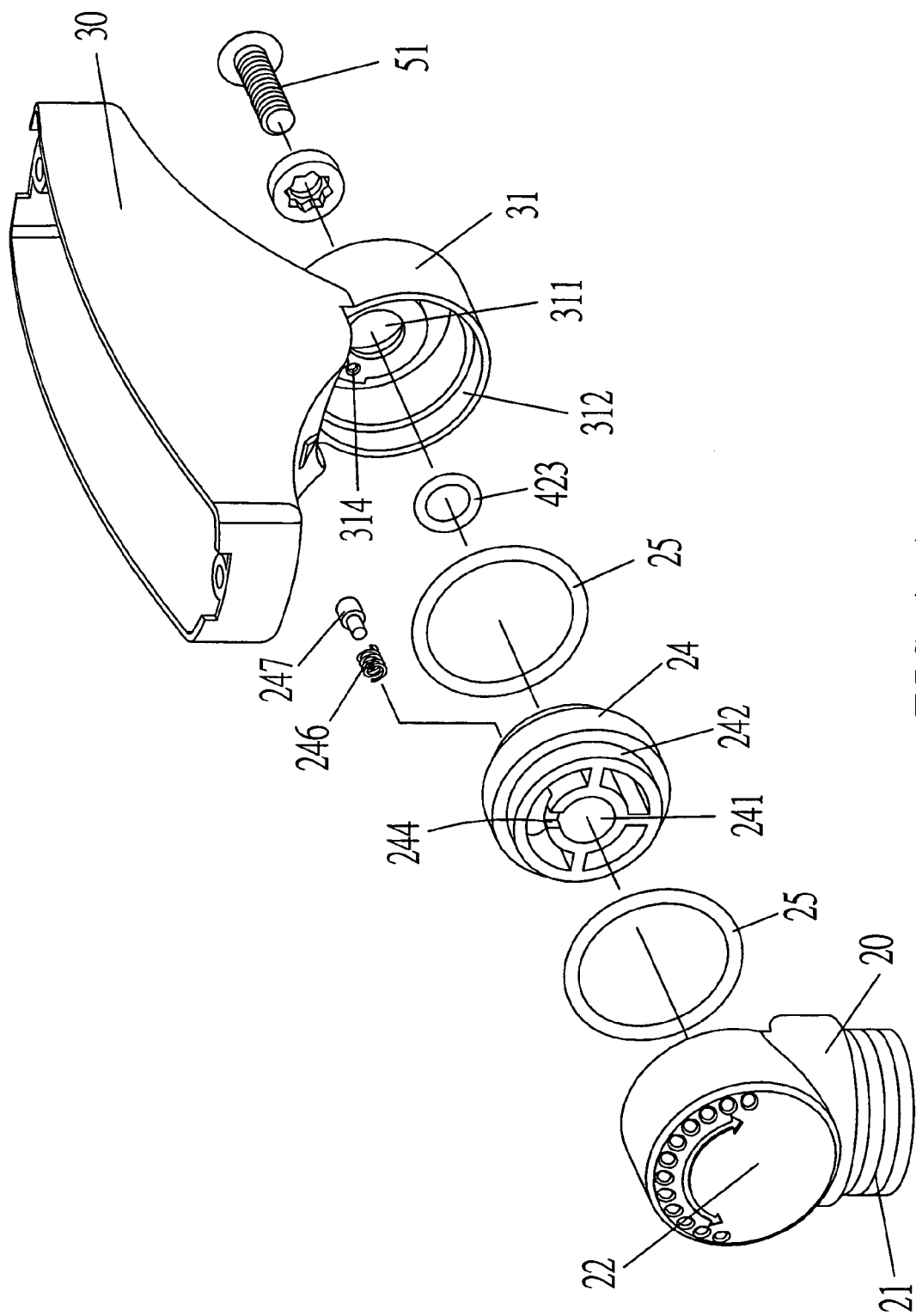
Figures 1, 2:
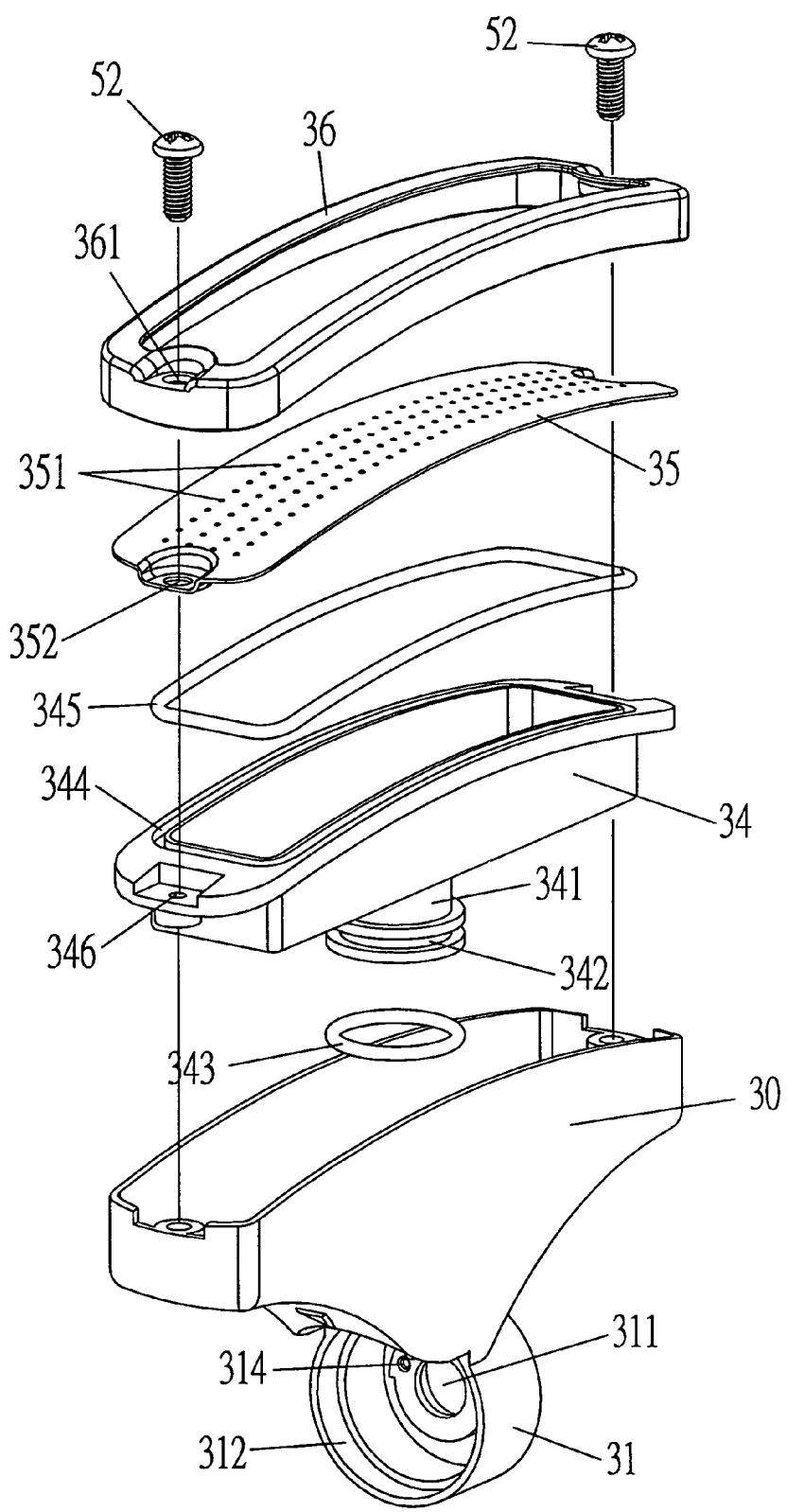
Figures 1, 2, 3:
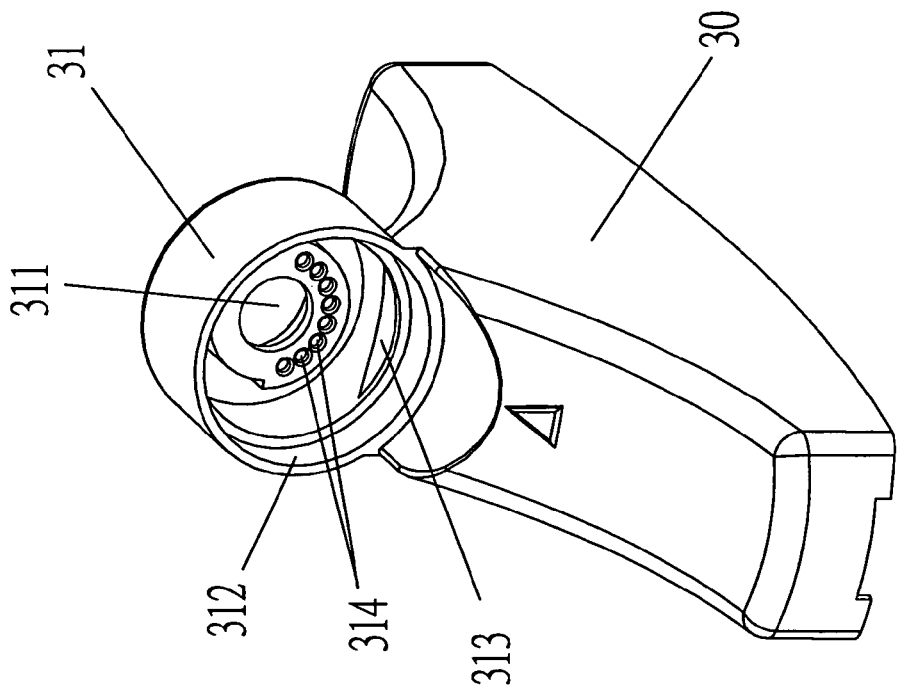
Figures 1, 2, 3, 4:
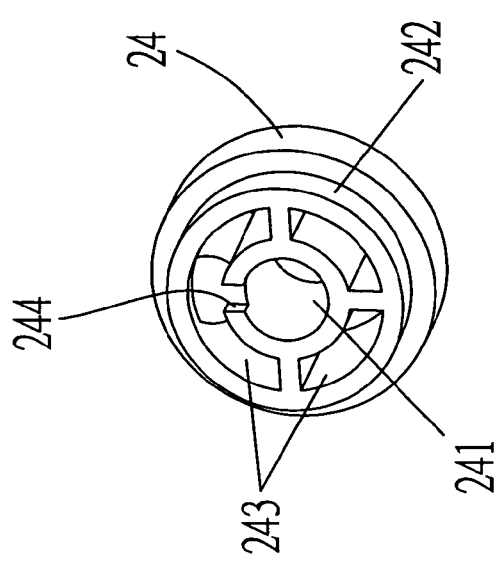
Figure 2:
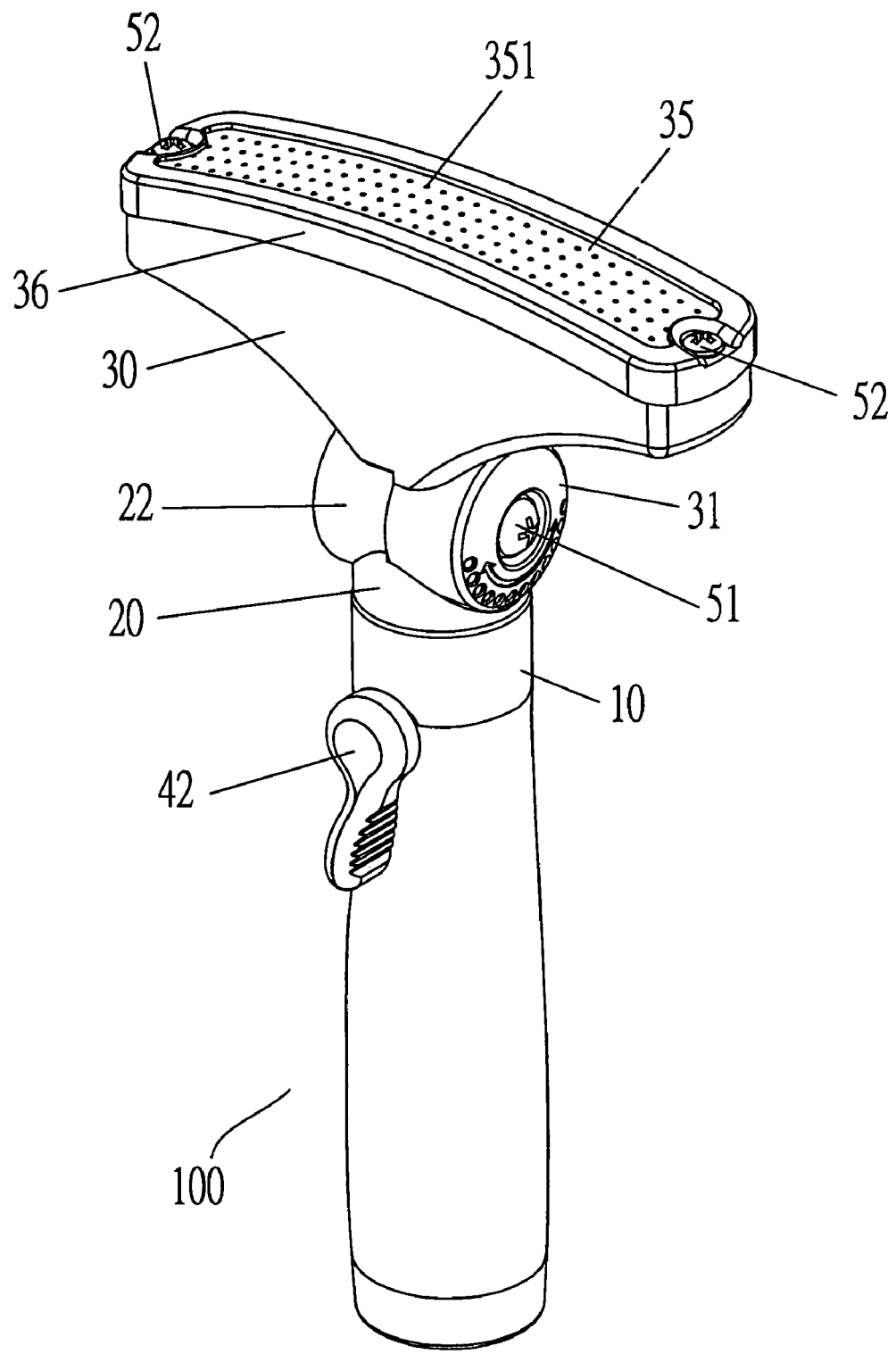
Figure 3:
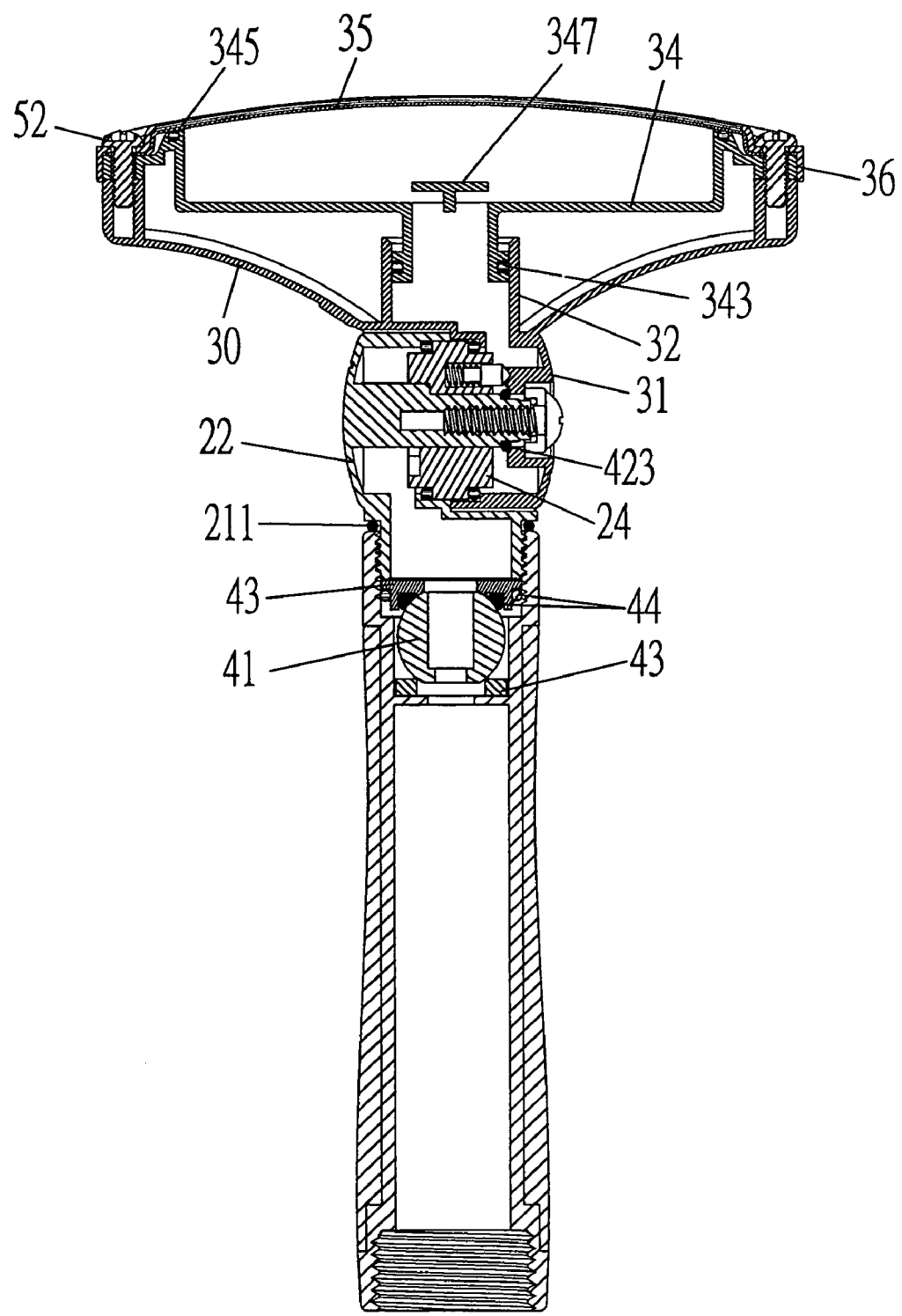
Figure 4:
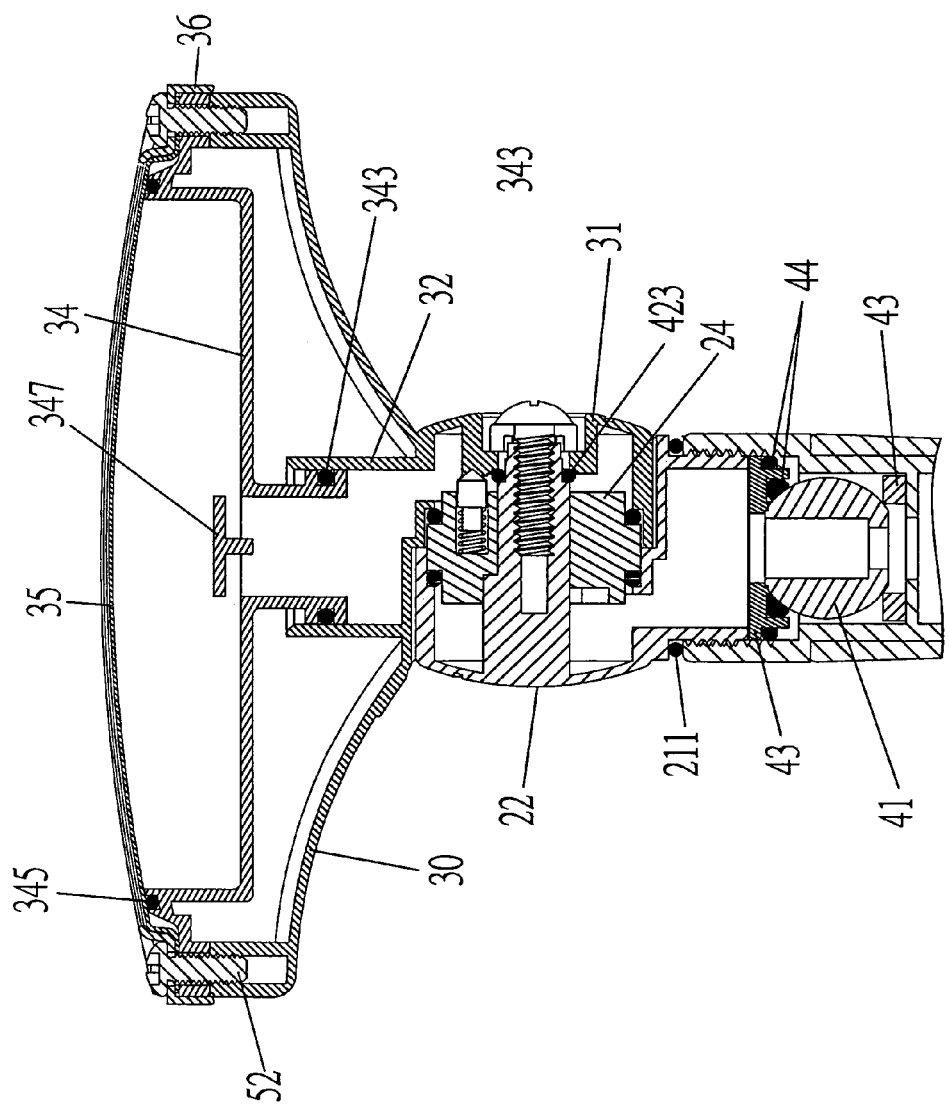

Referring to FIGS. 1, 1-1, 1-2, 1-3, 1-4, 2, 3 and 4, the watering nozzle assembly of the present invention of the present invention comprises a handle 100 having an inlet tube 10 received therein and two inner threaded sections 11 are defined in two ends of the handle 100 so that a pivotable device 20 and a hose (not shown) are respectively connected to the two inner threaded sections 11.

The pivotable device 20 is connected to a top end of the handle 100 and includes a first connection member 22 from which a connection portion extends and has an outer threaded section 21 which is connected to the inner threaded section 11 of the handle 100 with a seal 211 mounted to the connection portion. A pivot 223 extends from a side of the first connection member 22 and a threaded hole 2231 is defined in a distal end of the pivot 223. A first stepped surface 221 is defined in a side of the pivotable device 20 and a through hole 222 is defined in communication with the inlet tube 10. An intermediate member 24 is connected to the first connection member 22 and a second connection member 31 on an underside of an elongate nozzle member 30. The intermediate member 24 includes a central hole 241 through which the pivot 223 extends. Two second stepped surfaces 242 are defined in two opposite sides thereof and two seals 25 are engaged with the two second stepped surfaces 242. A plurality of ribs connected between an inner periphery of the intermediate member 24 and an outer periphery of the central hole 241 so as to define multiple orifices 243. A recess 245 is defined in a side thereof and a spring 246 and a positioning member 247 are received in the recess 245.

The second connection member 31 is mounted to the intermediate member 24 and the pivot 223 extends through the second connection member 31 so that a bolt 51 extends into the second connection member 31 and is threadedly connected to the threaded hole 2231 in the pivot 223. A plurality of positioning notches 314 are defined in an inside of the second connection member 31 so that the positioning member 247 is engaged with one of the positioning notches 314. The pivot 223 has a key 2232 on an outer periphery thereof so as to be engaged with the key way 244 defined in the intermediate member 24 such that the intermediate member 24 are integrally connected to the first connection member 22. The second connection member 31 has a pivotal hole 311 and a third stepped surface 311 is defined in a side of the second connection member 31 so that the other seal 25 is engaged with the third stepped surface 311. A through hole 313 is defined through the second connection member 31 so as to be in communication with a connection tube 32 in the nozzle member 30.

A flange 12 extends inward from an inner periphery of the inlet tube 10 and a radial hole 13 is defined through a wall of the handle 100 and the inlet tube 10 is located above the flange 12. A switch device 140 includes a ball valve 41 received in the inlet tube 10. The ball valve 41 includes a passage 411 defined therethrough and a slot 412 is defined in an outer periphery of the ball valve 41. A control lever 42 includes a stud 421 which is rotatably engaged with the radial hole 13 and an insertion 422 is connected to the stud 421 so as to be engaged with the slot 412 of the ball valve 41. The ball valve 41 is located between two washers 43 which are respectively in contact with the outer threaded section 21 of the pivotable device 20 and the flange 12. Two seals 44 are located between the ball valve 41 and the washer 43 opposite to the flange 12. Because the switch device 140 is located on the handle 100 so that the user can easily operate the control lever 42 by his or her thumb.

A tank member 34, a porous plate 35 with orifices 351 and a frame 36 are respectively connected to the nozzle member 30. The nozzle member 30 includes two threaded holes 33 defined in two ends of a top thereof, each of the tank member 34, the porous plate 35 and the frame 36 has two through holes 346/352/361 so that two bolts 33 extend through the through holes 346, 352, 361 and are connected to the threaded holes 33 in the nozzle member 30. A seal ring 343 is connected between the tank member 34 and the nozzle member 30 and a seal member 345 is connected between the porous plate 35 and the tank member 34. The tank member 34 includes a neck 341 extending from an underside thereof and the neck 341 is inserted into the connection tube 32 in the nozzle member 30. The neck 341 includes a groove 342 defined in an outer periphery thereof and the seal ring 343 is engaged with the groove 342. The tank member 34 has an open top and an engaging groove 344 is defined along a periphery of the open top so that the seal member 345 is engaged with the engaging groove 344 and in contact with the porous plate 355. A dispenser plate 347 is located in the neck 341 of the tank member 34.

Figure 5:
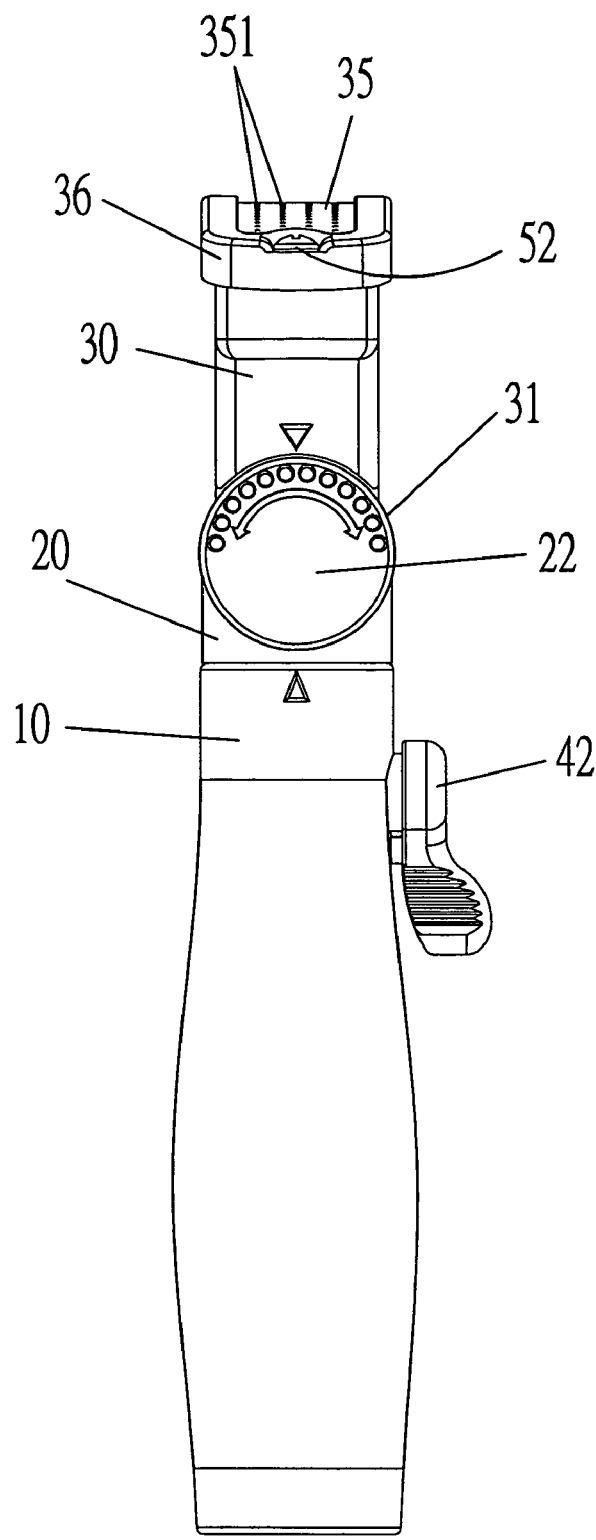
FIG. 5 is a side view of the watering nozzle assembly of the present invention.
Figure 6:
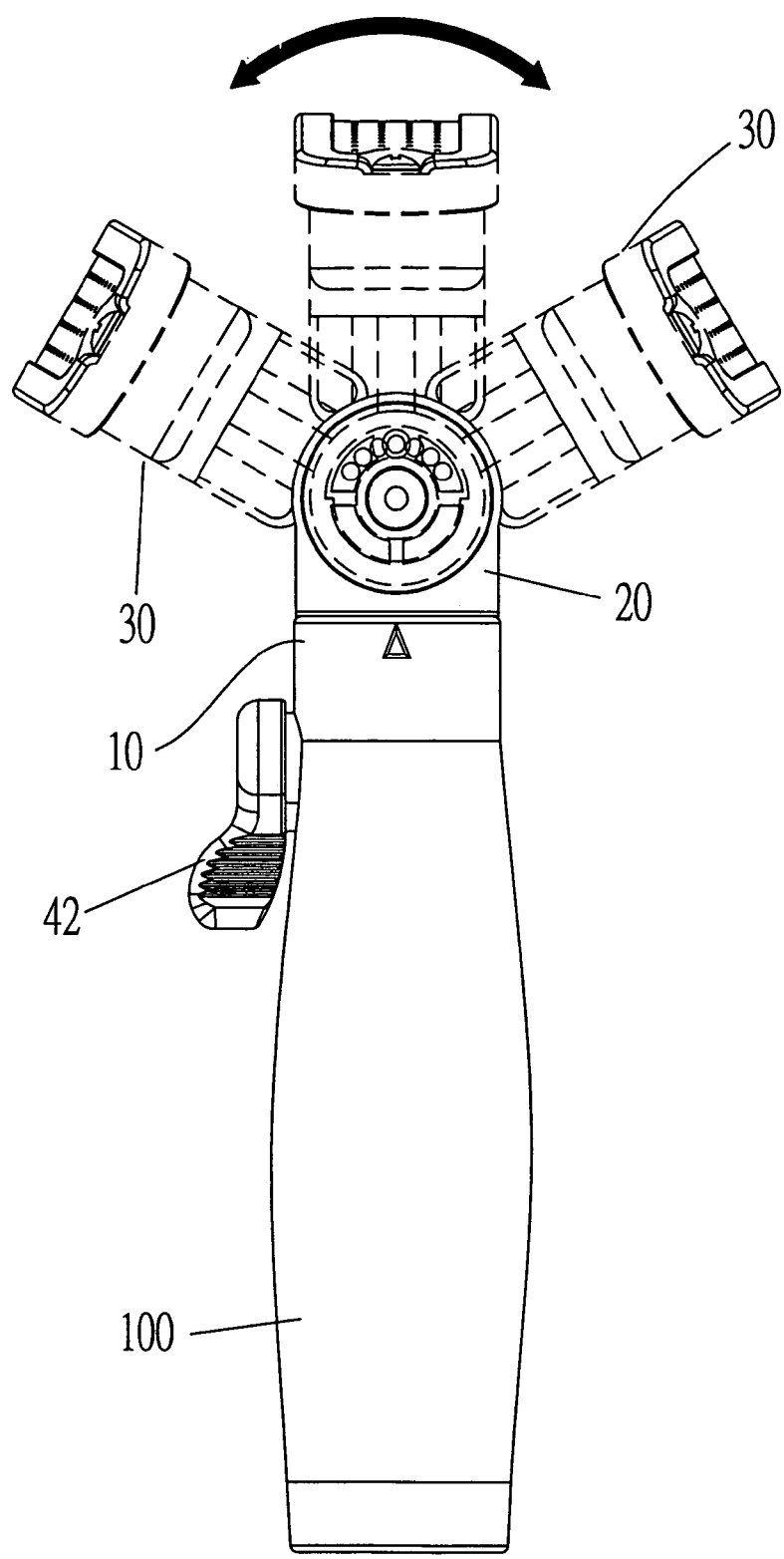
FIG. 6 shows that the nozzle member is pivotable relative tot eh handle.

Referring to FIGS. 5 and 6, when rotating the nozzle member 30 about the pivot 223, the positioning member 247 is removed from one positioning notch 314 to another and a "click" sound is heard to let the users know the nozzle member 30 is rotated.

The switch device 140 and the pivotable device 20 are located close to each other and the two seals 25 on the intermediate member 24 ensure that no leakage happens at the pivotable device 20. The dispenser plate 347 in the neck 341 of the tank member 34 guides the water to quickly fill the tank member 34 so that the water goes out from the nozzle member in a form of wide stream. The nozzle member 30 can be pivoted by the same hand that holds the handle 100 and the volume of water entering the nozzle member 30 can also be controlled by operating the control lever 42 by the thumb.

While we have shown and described the embodiment in accordance with the present invention, it should be clear to those skilled in the art that further embodiments may be made without departing from the scope of the present invention.

What is claimed is:

1. A pivotable watering nozzle assembly comprising:

a handle having an inlet tube received therein and a pivotable device connected to a top end of the handle, a switch device connected to an outside of the handle;

the pivotable device including a first connection member and a pivot extending from a side of the first connection member, a threaded hole defined in a distal end of the pivot, an intermediate member connected to the first connection member;

two seals mounted to the intermediate member and a recess defined in a side thereof and a spring and a positioning member received in the recess;

a nozzle member having a second connection member connected thereto and the second connection member mounted to the intermediate member and the pivot extending through the second connection member, a bolt extending into the second connection member and threadedly connected to the threaded hole in the pivot, a plurality of positioning notches defined in an inside of the second connection member so that the positioning member is engaged with one of the positioning notches, and a tank member, a porous plate with orifices and a frame respectively connected to the nozzle member, a seal ring connected between the tank member and the nozzle member, a seal member connected between the porous plate and the tank member.

2. The assembly as claimed in claim 1, wherein the handle includes an inner threaded section defined in an end thereof so as to be connected with the pivotable device.

3. The assembly as claimed in claim 1, wherein a flange extends inward from an inner periphery of the inlet tube and a radial hole is defined through a wall of the handle and the inlet tube is located above the flange, the switch device is engaged with the radial hole.

4. The assembly as claimed in claim 3, wherein the ball valve is located between two washers which are respectively in contact with the outer threaded section of the pivotable device and the flange, a seal is located between the ball valve and the washer opposite to the flange.

5. The assembly as claimed in claim 1, wherein the switch device includes a ball valve received in the inlet tube, the ball valve includes a passage defined therethrough and a slot is defined in an outer periphery of the ball valve, a control lever includes a stud which is rotatably engaged with the radial hole and an insertion is connected to the stud so as to be engaged with the slot of the ball valve.

6. The assembly as claimed in claim 1, wherein the pivotable device includes a connection portion with an outer threaded section which is connected to the inner threaded section of the handle.

7. The assembly as claimed in claim 1, wherein the pivotable device includes a first stepped surface defined in a side thereof and a through hole is defined in communication with the inlet tube, the pivot has a key on an outer periphery thereof so as to be engaged with the key way defined in the intermediate member.

8. The assembly as claimed in claim 1, wherein the intermediate member includes a central hole through which the pivot extends and two second stepped surfaces are defined in two opposite sides thereof, two seals are engaged with the two second stepped surfaces, a plurality of ribs connected between an inner periphery of the intermediate member and an outer periphery of the central hole so as to define multiple orifices.

9. The assembly as claimed in claim 8, wherein second connection member has a pivotal hole and a third stepped surface is defined in a side of the second connection member so that one of the seals is engaged with the third stepped surface, a through hole is defined through the second connection member so as to be in communication with a connection tube in the nozzle member.

10. The assembly as claimed in claim 1, wherein the nozzle member is an elongate member.

11. The assembly as claimed in claim 1, wherein the nozzle member includes two threaded holes defined in two ends of a top thereof, each of the tank member, the porous plate and the frame has two through holes so that two bolts extend through the through holes and are connected to the threaded holes in the nozzle member.

12. The assembly as claimed in claim 1, wherein the tank member includes a neck extending from an underside thereof and the neck is inserted into a connection tube in the nozzle member, the neck includes a groove defined in an outer periphery thereof and the seal ring is engaged with the groove.

13. The assembly as claimed in claim 1, wherein the tank member has an open top and an engaging groove is defined along a periphery of the open top, the seal member is engaged with the engaging groove and in contact with the porous plate.

14. The assembly as claimed in claim 1, wherein a dispenser plate is located in the neck of the tank member.

* * * * *